United States Patent
Lahbabi et al.

(10) Patent No.: US 10,404,498 B2
(45) Date of Patent: Sep. 3, 2019

(54) PRECOMPENSATION OF INTERFERENCE INDUCED BY AN OFDM/OQAM MODULATION THAT IS FASTER THAN NYQUIST

(71) Applicant: ORANGE, Paris (FR)

(72) Inventors: Naila Lahbabi, Rennes (FR); Hao Lin, Rennes (FR); Pierre Siohan, Rennes (FR)

(73) Assignee: ORANGE, Pairs (FR)

( * ) Notice: Subject to any disclaimer, the term of this patent is extended or adjusted under 35 U.S.C. 154(b) by 0 days.

(21) Appl. No.: 15/781,451

(22) PCT Filed: Dec. 13, 2016

(86) PCT No.: PCT/FR2016/053361
§ 371 (c)(1),
(2) Date: Jun. 4, 2018

(87) PCT Pub. No.: WO2017/103423
PCT Pub. Date: Jun. 22, 2017

(65) Prior Publication Data
US 2018/0359120 A1    Dec. 13, 2018

(30) Foreign Application Priority Data
Dec. 18, 2015   (FR) ...................................... 15 62842

(51) Int. Cl.
*H04L 25/03* (2006.01)
*H04L 27/26* (2006.01)

(52) U.S. Cl.
CPC .. *H04L 25/03821* (2013.01); *H04L 25/03343* (2013.01); *H04L 27/2634* (2013.01); *H04L 27/2698* (2013.01)

(58) Field of Classification Search
CPC .......... H04B 7/0456; H04B 3/32; H04B 7/04; H04B 7/068; H04B 7/0686; H04L 5/0048; H04L 1/0606; H04L 5/001; H04L 5/0023

See application file for complete search history.

(56) References Cited

U.S. PATENT DOCUMENTS

| | | | |
|---|---|---|---|
| 2008/0260058 A1* | 10/2008 | Li | H04B 7/0634 375/260 |
| 2010/0215031 A1* | 8/2010 | Kim | H04L 5/0021 370/344 |

(Continued)

FOREIGN PATENT DOCUMENTS

WO    WO2012042490 A2    4/2012

OTHER PUBLICATIONS

The Written Opinion of the International Search Authority for International Application No. PCT/FR2016/053361.

(Continued)

*Primary Examiner* — Khanh C Tran
(74) *Attorney, Agent, or Firm* — Haverstock & Owens LLP

(57) ABSTRACT

The invention relates to precoding (or rather pre-equalization) for a faster-than-Nyquist OFDM or OFDM/OQAM type transmitter. Compression of faster-than-Nyquist OFDM pulses over time introduces an inter-symbol interference (ISI) and a sub-carrier interference (ICI). Assuming a Gaussian-type channel (AWGN), the ISI and ICI can be estimated at the transmitter and, in this way, some of the symbols (at most half) can be precoded (according to the value of the adjacent symbols), such as to cancel the ISI and ICI introduced during transmission and reception.

14 Claims, 7 Drawing Sheets

(56) References Cited

U.S. PATENT DOCUMENTS

| | | | | |
|---|---|---|---|---|
| 2011/0244272 A1* | 10/2011 | Suzuki | ................... | B82Y 30/00 |
| | | | | 428/842.8 |
| 2014/0169415 A1* | 6/2014 | Werner | ................ | H04B 7/0456 |
| | | | | 375/219 |
| 2015/0244418 A1* | 8/2015 | Verbin | ..................... | H04B 3/32 |
| | | | | 370/201 |
| 2017/0048094 A1* | 2/2017 | Bae | ....................... | H04L 25/024 |
| 2017/0310373 A1* | 10/2017 | Jana | .................. | H04L 25/03343 |

OTHER PUBLICATIONS

Javaudin J-P et al., "Pilot-aided channel estimation for OFDM/OQAM", VTC 2003-Spring. The 57th IEEE Semi Annual Vehicular Technology Conference, vol. 3, Apr. 22, 2003, pp. 1581-1585, XP010862427, ISBN: 978-0-7803-7757-8.

Rusek F et al., "Non Binary and Precoded Faster Than Nyquist Signaling" IEEE Transactions on Communications, IEEE Service Center, vol. 56, No. 5, May 1, 2008, pp. 808-817, XP011227217.

Dinh-Thuy Phan Huy et al., "Make-It-Real Precoders for MIMO OFDM/OQAM without inter carrier inte". 2013 IEE Global Communications Conference, Dec. 9, 2013, XP032605108.

Niaila Lahbabi et al., "Sparse interference pre-cancellation for FTN-OQAM Systems" May 18, 2016, pp. 173-178, XP002761336.

Yamada Yuki et al., "Faster-than-Nyquist signaling with non-uniform compression factors for OFDM/OQAM", 2015 International Symposium on Intelligent signal processing and communcation systems, IEEE, Nov. 9, 2015, pp. 520-525, XP032881224.

Search Report from French Application No. 1562842 dated Sep. 1, 2016.

\* cited by examiner

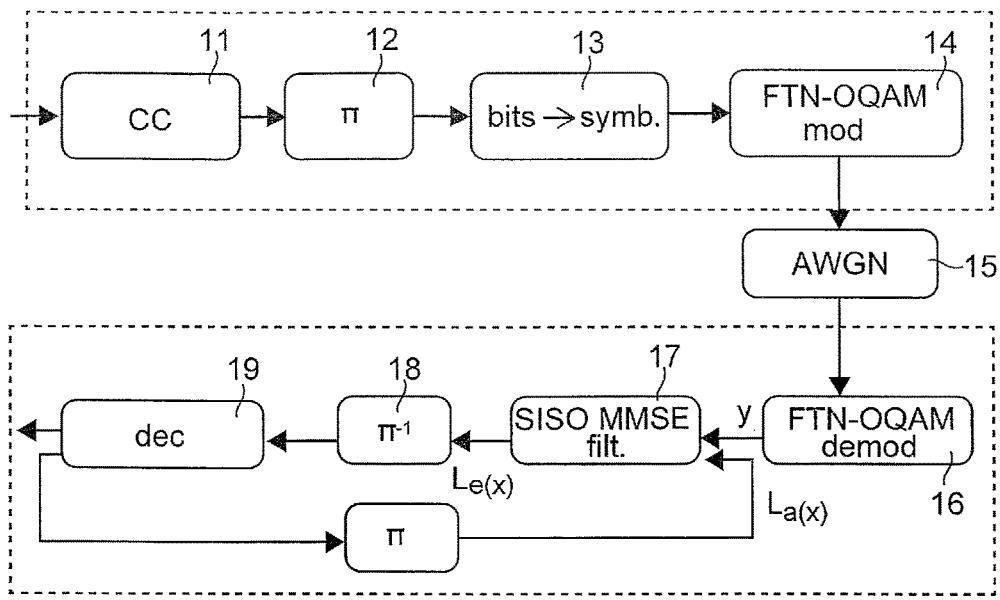
Fig. 1 PRIOR ART
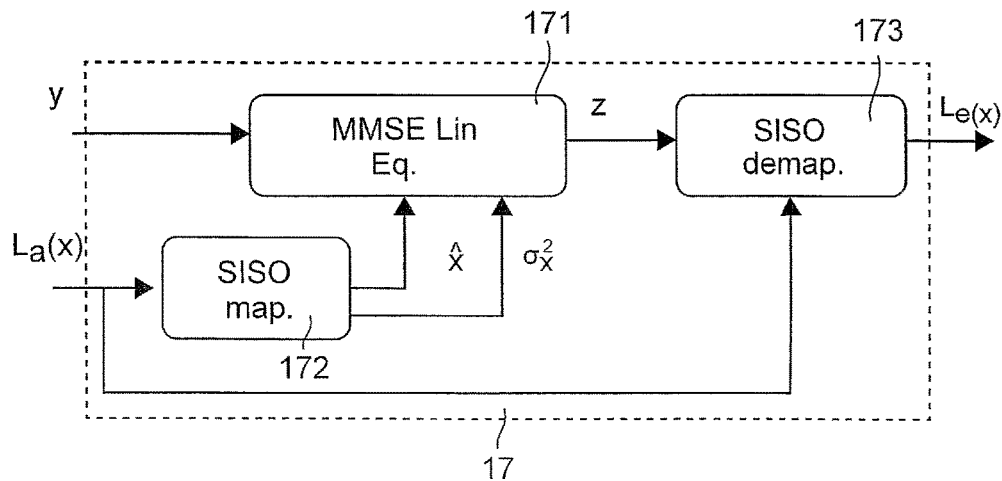
PRIOR ART  Fig. 2

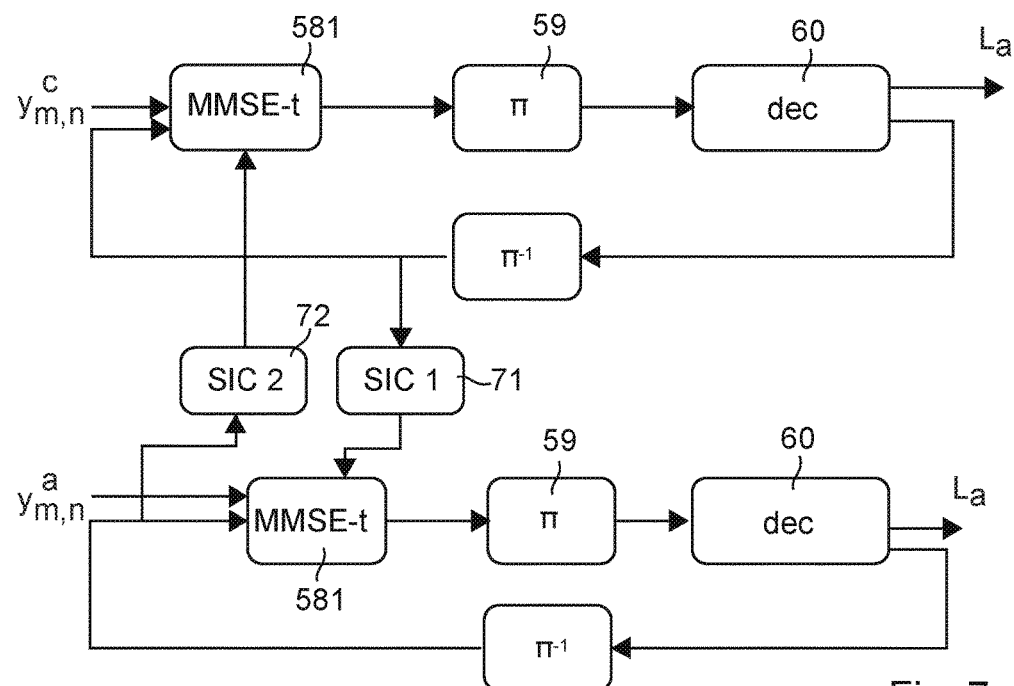
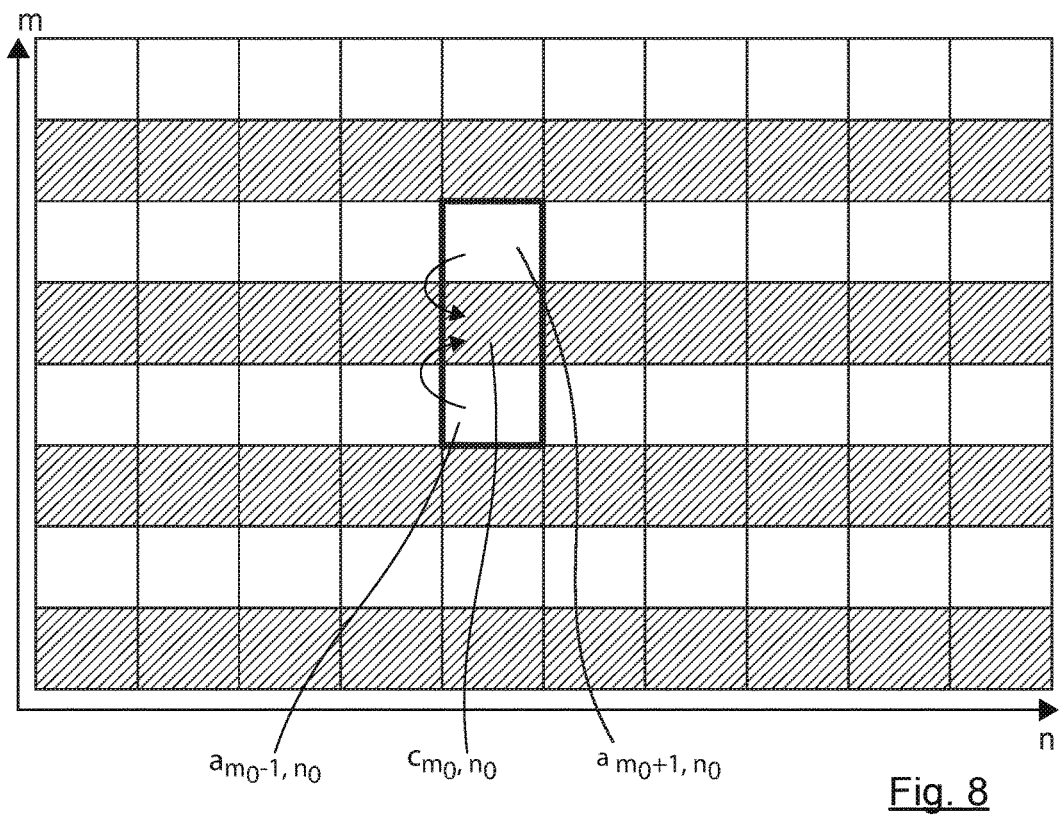
Fig. 7
Fig. 8

PRECOMPENSATION OF INTERFERENCE INDUCED BY AN OFDM/OQAM MODULATION THAT IS FASTER THAN NYQUIST

1. FIELD OF THE INVENTION

The field of the invention is that of communications implementing a multicarrier modulation.

More specifically, the invention provides a modulation technique allowing a faster-than-Nyquist (FTN in English) data transmission for multicarrier systems.

The invention notably finds applications in the field of wireless communications (DAB, DVB-T, WLAN, non-guided optical, etc.) or wireline (xDSL, PLC, optical, etc.). For example, the invention finds applications in the field of cellular communications, upstream or downstream voice, communications between devices (D2D for "Device to Device" in English), communications from a rerouting network ("backhauling" in English), etc.

2. PRIOR ART

The principle of faster-than-Nyquist transmissions was introduced in 1975 by E. Mazo, in the document "Faster-than-Nyquist signaling" (Bell. Syst. Tech. Journal, 54: 1451-1462).

According to this document, Nyquist rate transmission may be illustrated by considering the transmission of a series of independent binary information items $\{a_n\}$ such that $a_n = \pm 1$ by a Nyquist pulse:

$$g(t) = \frac{\sin(\pi t/T)}{(\pi t/T)}$$

This transmission may be performed without interference, and therefore without error, in a transmission channel of width B (unilateral band), with T the transmission time of a symbol such that $T = \frac{1}{2}B$. In the case of a transmission disturbed by an additive, white Gaussian noise (AWGN for "Additive White Gaussian Noise" in English), the optimal detector, which will minimize the bit error probability, is achieved with the use in reception of a filter suited to the Nyquist pulse, i.e. $g(-t)$.

This system of transmission is orthogonal, i.e. it verifies the condition:

$\int g(t-nT)g(t-n'T)dt = \delta_{n,n'}$ where $\delta$ designates the Kronecker symbol.

To go faster than the Nyquist rate (FTN), without modifying the transmission power, it is possible to bring the pulses together by transmitting them spaced apart by a duration $T' < T$, in other words by compressing them by a factor $\tau$ such that $T' = \tau T$ with $0 < \tau < 1$. It is then verified instead of $BT = \frac{1}{2}$, that $BT' < \frac{1}{2}$.

Such an FTN transmission therefore makes it possible to reduce the transmission time for a given volume of information or, in other words, to increase the volume of information for a given transmission time.

However, FTN transmission generates strong interference, as illustrated below.

FIG. 1 illustrates an example of a transmission system for FTN/OFDM/OQAM, also known as FTN/OQAM, type transmissions.

On transmission, the bits of a source signal are first coded by a channel coder CC 11, which represents a convolutional code, and interleaved by an interleaver $\pi$ 12. The interleaved coded bits are then mapped to OQAM symbols, in a mapping module 13, using, for example, the Gray mapping technique. The multicarrier signal carriers are then modulated with the OQAM symbols in an FTN-OQAM modulator 14.

The output signal of the FTN-OQAM modulator 14 is written:

$$s[k] = \sum_{n=0}^{\infty} g[k-nN_f] * \sum_{m=0}^{M-1} a_{m,n} e^{j\Phi_{m,n}} e^{j2\pi m(nN_f - \frac{D}{2})} e^{\frac{j2\pi m(k-nN_f)}{M}}$$

with:
g the waveform used;
M the number of carriers;

$$N_f = \left[\tau \cdot \frac{M}{2}\right]_{rounded},$$

with $\tau$ the compression factor;
L the length of the prototype filter g;
$D = L-1$ a delay parameter introduced to make the system causal;
$a_{m,n}$ the symbols to be transmitted, with real values for an OQAM modulation;
$\Phi_{m,n}$ a phase term of the FTN/OQAM modulation, which may be equal to $$\Phi_{m,n} = \frac{\pi}{2}(m+n)$$

After passage in an AWGN channel 15, the received signal is first demodulated by an FTN-OQAM demodulator 16.

The symbol received at instant $n_0$ on the carrier $m_0$ may be expressed in the following form:

$$y_{m_0,n_0} = \Re\left\{\sum_k s[k]g[k-n_0N_f]e^{-j\Phi_{m_0,n_0}} e^{-\frac{j2\pi m_0(k-\frac{D}{2})}{M}}\right\} + w_{n_0}$$

or even:

$$y_{m_0,n_0} = a_{m_0,n_0} + \Re\left\{\sum_{n \neq n_0} a_{m_0,n} e^{\frac{j\pi}{2}(n-n_0)} \sum_k g[k-nN_f]g[k-n_0N_f]e^{\frac{j2\pi(k-\frac{D}{2})(m-m_0)}{M}}\right\} +$$

$$\Re\{m \neq m0 nam, ne j\pi 2m - m0 + n - n0kgk - nNfgk - n0Nfej2\pi k - D2m - m0M\} + wn0$$

The first term of the equation ($a_{m_0,n_0}$) is the useful symbol, the second term corresponds to the intersymbol interference (ISI), the third term corresponds to the intercarrier interference (ICI$_{n_0}$) and $w_{n_0}$ is the Gaussian noise. The ICI depends on the time instant.

$y_{m_0,n_0} = a_{m_0,n_0}ISI + ICI_{n_0}w_{n_0}.$

The symbols coming from the FTN-OQAM demodulator 16 are then filtered by an SISO MMSE filter 17, deinterleaved by a deinterleaver $\pi^{-1}$ 18, then decoded by a decoder 19.

For example, a receiver based on the principle of turbo equalization is considered. The information coming from the decoder 19 is therefore used for updating the SISO MMSE filter 17, by communicating thereto logarithmic likelihood ratio type information (LLRs) $L_a(x)$.

More specifically, as shown in FIG. 2, the SISO MMSE processing module 17 exchanges "soft" (in English) information with the decoder 19. The SISO MMSE processing module 17 includes:

- an MMSE type linear equalizer 171, receiving the demodulated signal y and information from the decoder 19, delivering an equalized signal z;
- a SISO mapping module 172 delivering estimated symbols $\bar{x}$ with a variance $\sigma_x^2$, from the LLRs a priori provided by the decoder at the preceding iteration, denoted by $L_a(x)$; and
- a SISO demapping module 173 calculating extrinsic LLRs $L_e(x)$, taking as input the equalized signal z.

A similar scheme may be implemented for FTN/OFDM type transmissions.

In this case, the output signal of the FTN-OFDM modulator is written:

$$s[k] = \sum_{n=0}^{\infty} \sum_{m=0}^{M-1} a_{m,n} e^{\frac{j2\pi m\left(k-nN_f-\frac{M-1}{2}\right)}{M}}$$

using the same notations as previously, with $a_{m,n}$ the symbols to be transmitted with complex values for an OFDM modulation, and $N_f=[\tau \cdot M]_{rounded}$.

The symbol received at instant $n_0$ on the carrier $m_0$ may be expressed in the following form:

$$y_{m_0,n_0} = \sum_k s[k] e^{-\frac{j2\pi m_0\left(k-n_0N_f-\frac{M-1}{2}\right)}{M}} + w_{n_0}$$

or even:

$$y_{m_0,n_0} = a_{m_0,n_0} + \sum_{n_0-\left(\left[\frac{M}{N_f}\right]-1\right)}^{n_0+\left(\left[\frac{M}{N_f}\right]-1\right)} Me^{\frac{j2\pi N_f m_0(n-n_0)}{M}} a_{m_0,n} +$$

$$\sum_{m \neq m_0} \sum_{n_0-\left(\left[\frac{M}{N_f}\right]-1\right)}^{n_0+\left(\left[\frac{M}{N_f}\right]-1\right)} a_{m,n}$$

$$\sum_k e^{\left(\frac{j2\pi\left(k-\frac{M-1}{2}\right)(m-m_0)}{M}\right)} e^{\frac{j2\pi N_f(n_0m_0-nm)}{M}} + w_{n_0}$$

The first term of the equation ($a_{m_0,n_0}$) is the useful symbol, the second term corresponds to the intersymbol interference (ISI), the third term corresponds to the intercarrier interference (ICI) and $w_{n_0}$ is the Gaussian noise.

There is therefore a need for a new FTN transmission technique suited to a multicarrier system not exhibiting all the drawbacks of the prior art.

3. DISCLOSURE OF THE INVENTION

The invention provides a new solution which does not exhibit all these drawbacks of the prior art, in the form of a method of generating a multicarrier signal, from a set of symbols, including:

- a step of precoding a first subset of symbols of the set of symbols, delivering a first subset of precoded symbols, said step of precoding modifying the value of a symbol of the first subset for taking account of interference generated by at least one other symbol of the set of symbols intended to be transmitted at the same instant or at the same frequency according to a predetermined time/frequency transmission pattern, and
- a step of modulating a set of carriers from the first subset of precoded symbols and a second subset of non-precoded symbols of the set of symbols, delivering said multicarrier signal,
  said step of modulating each carrier of the set of carriers by a precoded symbol of the first subset or by a non-precoded symbol of the second subset according to the predetermined transmission pattern.

The invention thus provides a new solution for generating a multicarrier signal making it possible to at least partially cancel interference affecting at least one symbol during the transmission of the multicarrier signal. Accordingly, the detection of the symbols in reception is also improved.

To do this, the invention provides for precoding some symbols, before their transmission, for at least partially canceling the intersymbol and/or intercarrier interference likely to affect this symbol in the course of transmission.

Thus, rather than transmit a symbol $a_{m,n}$, provision is made to transmit a symbol $c_{m,n}$, such that:

$$c_{m,n} = a_{m,n} - \alpha ISI - \beta ICI_n$$

with:

$\alpha, \beta \in \mathbb{R}$, $0 \leq \alpha$, $\beta \leq 1$, $\alpha \neq 0$ if it is sought to at least partially cancel intersymbol interference ISI likely to affect this symbol at the position (m, n), $\alpha=0$ otherwise, and $\beta \neq 0$ if it is sought to at least partially cancel intercarrier interference ICI likely to affect this symbol at the position (m, n), $\beta=0$ otherwise.

A particular value is therefore assigned to some symbols, according to their position (i.e. their time/frequency location) in a transmission pattern (i.e. in the block of symbols to be transmitted), so that the symbol received at this position is not, or only slightly, marred by interference (i.e. disrupted by interference). Therefore the interference having to assign a symbol is at least partially precanceled, according to the transmission pattern used.

In particular, the invention may be applied to multicarrier modulation systems initially satisfying either the condition of complex orthogonality (as for OFDM), or the condition of real orthogonality (as for OFDM/OQAM). The symbols may therefore be of the real or complex type.

According to a particular embodiment, the multicarrier signal is formed of a temporal succession of multicarrier symbols intended to be transmitted at a faster-than-Nyquist rate.

The invention thus provides for reducing the interference generated by a faster-than-Nyquist (FTN) transmission of the multicarrier signal. It is thus possible to reduce the transmission time for a given volume of information.

In addition, the FTN transmission in the form of a frequency multiplex makes it possible to benefit from the advantages of multicarrier systems, such as the flexibility of the modulator (e.g. the possibility of switching off some carriers) or the use of efficient algorithms for implementing the modem (e.g. on the basis of fast Fourier transforms:

IFFT—"Inverse Fast Fourier Transform" in English, or FFT—"Fast Fourier Transform" in English).

The solution provided thus offers a new technique of generating (or constructing) a multicarrier signal allowing an increase in the transmission rate in a given frequency band, while making it possible to reduce the interference associated with the FTN transmission.

According to a specific aspect of the invention, the number of precoded symbols of said first subset is less than or equal to the number of non-precoded symbols of said second subset.

In other words, the transmission pattern includes fewer precoded symbols than non-precoded symbols, or as many precoded symbols as non-precoded symbols.

Indeed, as for a symbol $a_{m,n}$, the symbols $a_{m,n+p}$ and $a_{m,n-p}$ participate in ISI, and the symbols $a_{m+q,n}$ and $a_{m-q,n}$ participate in ICI, with p, $q \in \mathfrak{R}^+$, $p \in [-l, l]$ and $q \in [-l', l']$, the interference of all the symbols cannot be precanceled.

For example, it is chosen to precode half the block of symbols transmitted.

According to a first example, the step of modulating implements an FTN-OQAM type modulation, and the step of precoding delivers, from a symbol $a_{m_0,n_0}$ of the set of symbols, a precoded symbol $c_{m_0,n_0}$ intended to modulate a carrier at the location $(m_0, n_0)$ in the predetermined transmission pattern, such that:

$$c_{m_0,n_0} = \begin{cases} \begin{pmatrix} a_{m_0,n_0} - \alpha ISI (\text{if } \beta = 0 \text{ and } n_0 = k \bmod(l+2) \text{ and} \\ n_0 = (k+1) \bmod(l+2), (k \in \mathbb{N} \text{ and } k \leq l+1) \end{pmatrix} \\ (a_{m_0,n_0} - \beta ICI, \text{ if } (\alpha = 0 \text{ and } m_0 = k \bmod(l'+1), \\ (k \in \mathbb{N} \text{ and } k \leq l'))) \\ \begin{pmatrix} a_{m_0,n_0} - \alpha ISI - \beta ICI \text{ if } (m_0 = k \bmod(l'+1), \\ (k \in \mathbb{N} \text{ and } k \leq l')) \text{ and} \\ n_0 = k' \bmod (l+2) \text{ and } n_0 = (k'+1)\bmod(l+2), \\ (k' \in \mathbb{N} \text{ and } k' \leq l+1) \end{pmatrix} \end{cases}$$

with:
mod the modulo operator,
α and β selection factors of a type of interference to be processed, α, $\beta \in \mathbb{R}$, $0 \leq \alpha$, $\beta \leq 1$,
ICI an intercarrier interference term determined on said carrier at the location $(m_0, n_0)$ and
ISI an intersymbol interference term determined on said carrier at the location $(m_0, n_0)$.

As mentioned in relation to the prior art, for an FTN/OQAM modulation, the intersymbol ISI and intercarrier ICI interference terms may be expressed in the following form:

$$ISI = \mathfrak{R}\left\{ \sum_{n \neq n_0} a_{m_0,n} e^{\frac{j\pi}{2}(n-n_0)} \sum_k g[k-nN_f]g[k-n_0N_f]e^{\frac{j2\pi(k-\frac{D}{2})(m-m_0)}{M}} \right\}$$

$$ICI = \mathfrak{R}\left\{ \sum_{m \neq m_0} \sum_n a_{m,n} e^{\frac{j\pi}{2}(m-m_0+n-n_0)} \sum_k g[k-nN_f]g[k-n_0N_f]e^{\frac{j2\pi(k-\frac{D}{2})(m-m_0)}{M}} \right\}$$

with $a_{m,n}$ said at least one other symbol of said set of symbols generating interference on said symbol $a_{m_0,n_0}$.

Knowing the form of the interference conventionally affecting the symbol at the location $(m_0, n_0)$ in the context of an FTN/OQAM modulation, it is possible to precode this symbol by modifying its value on transmission, for at least partially precanceling one and/or the other of these interferences, according to the position of this symbol in the transmission pattern, i.e. in the block of symbols to be transmitted.

It is to be noted that such expressions depend on the parameter $N_f$ and therefore make it possible to take account of the compression factor τ, since $$N_f = \left[\tau \cdot \frac{M}{2}\right]_{rounded}.$$

According to a second example, the step of modulating implements an FTN-OFDM type modulation, and the step of precoding delivers, from a symbol $a_{m_0,n_0}$ of the set of symbols, a precoded symbol $c_{m_0,n_0}$ intended to modulate a carrier at the location $(m_0, n_0)$ in said predetermined transmission pattern, such that:

$$c_{m_0,n_0} = \begin{cases} (a_{m_0,n_0} - \alpha ISI \text{ if } (\beta = 0 \text{ and } n_0 = k \bmod(l'+1), (k \in \mathbb{N} \text{ and } k \leq l'))) \\ (a_{m_0,n_0} - \beta ICI \text{ if } (\alpha = 0 \text{ and } m_0 = k \bmod(l+1), (k \in \mathbb{N} \text{ and } k \leq l))) \\ (a_{m_0,n_0} - \alpha ISI - \beta ICI \text{ if } (m_0 = k \bmod(l+1), \text{ and } n_0 = k' \bmod(l'+1), (k, k' \in \mathbb{N}, k \leq l \text{ and } k' \leq l'))) \end{cases}$$

with:
mod the modulo operator,
α and β selection factors of a type of interference to be processed, α, $\beta \in \mathbb{R}$, $0 \leq \alpha$, $\beta \leq 1$,
ICI an intercarrier interference term determined on said carrier at the location $(m_0, n_0)$ and
ISI an intersymbol interference term determined on said carrier at the location $(m_0, n_0)$.

As mentioned in relation to the prior art, for an FTN/OFDM modulation, the intersymbol ISI and intercarrier ICI interference terms may be expressed in the following form:

$$ICI = \sum_{m \neq m_0} \sum_{n_0 - \left(\left[\frac{M}{N_f}\right] - 1\right)}^{n_0 + \left(\left[\frac{M}{N_f}\right] - 1\right)} a_{m,n} \sum_k e^{\left(\frac{j2\pi(k - \frac{M-1}{2})(m-m_0)}{M}\right)} e^{\frac{j2\pi N_f(n_0 m_0 - nm)}{M}}$$

-continued $$ISI = \sum_{\substack{n=n_0-\left(\left[\frac{M}{N_f}\right]-1\right) \\ n \neq n_0}}^{n_0+\left(\left[\frac{M}{N_f}\right]-1\right)} Me^{\frac{j2\pi N_f m_0(n-n_0)}{M}} a_{m_0,n}$$

with $a_{m,n}$ said at least one other symbol of said set of symbols generating interference on the symbol $a_{m_0,n_0}$.

Again, such expressions depend on the parameter $N_f$, and therefore make it possible to take account of the compression factor $\tau$, since $N_f=[\tau \cdot M]_{rounded}$ for an FTN/OFDM modulation.

Knowing the form of the interference conventionally affecting the symbol at the location ($m_0$, $n_0$) in the context of an FTN/OFDM modulation, it is possible to precode this symbol by modifying its value on transmission, for at least partially precanceling one and/or the other of these interferences, according to the position of this symbol in the transmission pattern, i.e. in the block of symbols to be transmitted.

According to a particular feature, the predetermined transmission pattern is selected by taking into account at least one element belonging to the group including:
  a type of modulation implemented in said step of modulating;
  a type of prototype filter used in said step of modulating;
  a type of channel used for the transmission of said multicarrier signal.

For example, the transmission pattern is different for an FTN/OFDM modulation or for an FTN/OQAM modulation.

Similarly, if a prototype filter is used that is well located in frequency, such as the FS ("Frequency Selectivity" in English) filter with a length four times greater than the number of carriers M, there will be mainly intersymbol interference in the course of transmission, therefore a transmission pattern is selected suited to precanceling intersymbol interference. If, conversely, a prototype filter is used that is well located in time, such as the TFL filter, with a length equal to the number of carriers M, there will be mainly intercarrier interference in the course of transmission, therefore a transmission pattern is selected suited to precanceling intercarrier interference.

In another embodiment, the invention relates to a generating device for generating a multicarrier signal, from a set of symbols, including:
  a precoding module (e.g. a coder) of a first subset of symbols of the set of symbols, delivering a first subset of precoded symbols,
  said precoding module modifying the value of a symbol of said first subset for taking account of interference generated by at least one other symbol of the set of symbols intended to be transmitted at the same instant or at the same frequency according to a predetermined time/frequency transmission pattern, and
  a modulating module (e.g. a modulator) of a set of carriers from the first subset of precoded symbols and a second subset of non-precoded symbols of said set of symbols, delivering the multicarrier signal,
  said modulating module modulating each carrier of the set of carriers by a precoded symbol of the first subset or by a non-precoded symbol of the second subset according to said predetermined transmission pattern.

Such a generating device for generating a multicarrier signal is notably suited to implementing the method of generating previously described. It is, for example, a base station transmitter of a cellular network for a downstream communication, or a transmitter of a computer type terminal, telephone, tablet, decoder unit ("set-top box" in English), etc., for an upstream communication. This device could, of course, comprise different features relating to the method of generating according to the invention, which may be combined or taken individually. Thus, the features and advantages of this device are the same as those of the previously described method. Consequently, they are not more fully described.

The invention also relates to a method of receiving a multicarrier signal, delivering a set of estimated symbols, including:
  a step of demodulating a set of carriers forming said multicarrier signal, delivering a first subset of demodulated precoded symbols and a second subset of demodulated non-precoded symbols,
  a step of time and/or frequency equalization of the demodulated precoded symbols, delivering equalized demodulated precoded symbols, and
  a step of time and/or frequency equalization of the demodulated non-precoded symbols, taking into account the estimate of interference affecting said demodulated non-precoded symbols, obtained from said equalized demodulated precoded symbols, delivering equalized demodulated non-precoded symbols.

Such a method of receiving is notably suited to receiving a multicarrier signal generated according to the method of generating described above. In particular, such a method is capable of receiving a multicarrier signal transmitted at a faster-than-Nyquist rate.

Such a multicarrier signal includes precoded symbols, the value of which has been modified before transmission for taking account of interference generated by at least one other symbol of the set of symbols transmitted at the same instant or at the same frequency according to a predetermined time/frequency transmission pattern, and non-precoded symbols.

The interference affecting the precoded symbols in the course of transmission is at least partially canceled, thanks to the precanceling of this interference in the precoding. These precoded symbols are therefore only slightly marred by interference. On the other hand, the non-precoded symbols are conventionally marred by intersymbol and/or intercarrier interference.

The precoded symbols may therefore be first equalized, and the information obtained from these precoded symbols may be used for equalizing the non-precoded symbols.

The features and advantages of this method of receiving are mainly the same as those of the method of generating a multicarrier signal, and are not discussed in more detail.

In particular, the method of receiving also includes a step of decoding equalized demodulated precoded symbols, delivering a first subset of estimated symbols, and delivering the estimate of interference affecting said demodulated non-precoded symbols, and a step of decoding said equalized demodulated non-precoded symbols, delivering a second subset of estimated symbols.

According to a particular embodiment, the step of decoding said equalized demodulated non-precoded symbols also delivers an estimate of interference affecting said demodulated precoded symbols, and the step of time and/or frequency equalization of the demodulated precoded symbols takes account of the estimate of said interference affecting said demodulated precoded symbols.

Thus a feedback is introduced between the equalization of the demodulated precoded symbols and the demodulated non-precoded symbols, making it possible to improve the estimation/reconstruction of the (QAM, OQAM) symbols in reception.

According to another particular feature, the steps of decoding implement an algorithm of the Maximum A Posteriori (MAP), logarithmic MAP (Log-MAP) or maximum logarithmic MAP (Max-Log-MAP) type.

In another embodiment, the invention relates to a receiving device for receiving a multicarrier signal, delivering a set of estimated symbols, including:
  a demodulation module (or demodulator) of a set of carriers forming said multicarrier signal, delivering a first subset of demodulated precoded symbols and a second subset of demodulated non-precoded symbols,
  a time and/or frequency equalization module (or equalizer) of the demodulated precoded symbols, delivering equalized demodulated precoded symbols, and
  a time and/or frequency equalization module (or equalizer) of the demodulated non-precoded symbols, taking into account an estimate of the interference affecting said demodulated non-precoded symbols, obtained from said equalized demodulated precoded symbols, delivering equalized demodulated non-precoded symbols.

Such a receiving device is notably suited to implementing the method of receiving previously described. It is, for example, a base station receiver of a cellular network for an upstream communication, or a receiver of a computer type terminal, telephone, tablet, set-top box, etc., for a downstream communication. This device could, of course, comprise different features relating to the method of generating a multicarrier signal according to the invention, which may be combined or taken individually. Thus, the features and advantages of this device are the same as those of the previously described method. Consequently, they are not more fully described.

The invention further relates to one or more computer programs comprising instructions for the implementation of a method of generating a multicarrier signal as described above when this or these programs are executed by at least one processor and one or more computer programs comprising instructions for the implementation of a method of receiving a multicarrier signal as described above when this or these programs are executed by at least one processor.

The invention also relates to a computer-readable information medium, comprising instructions of a computer program such as that mentioned above.

4. LIST OF FIGURES

Other features and advantages of the invention will appear more clearly on reading the following description of a particular embodiment, given by way of a simple, illustrative and non-restrictive example, and the appended drawings, in which:

FIGS. 1 and 2 depict an example of an FTN transmission system according to the prior art;

Figure 15:
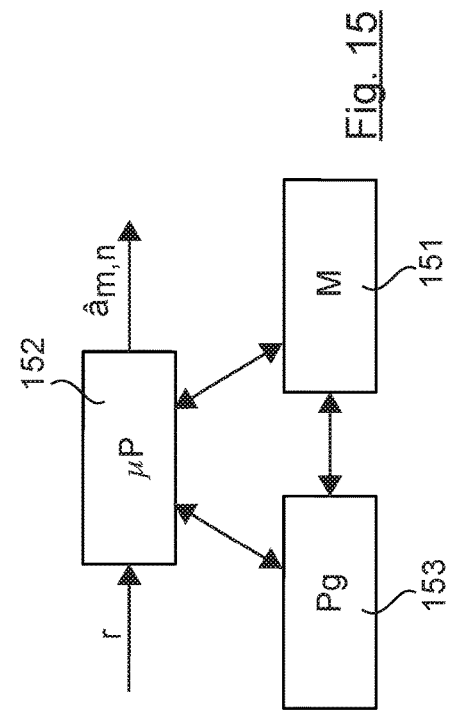
Figure 14:
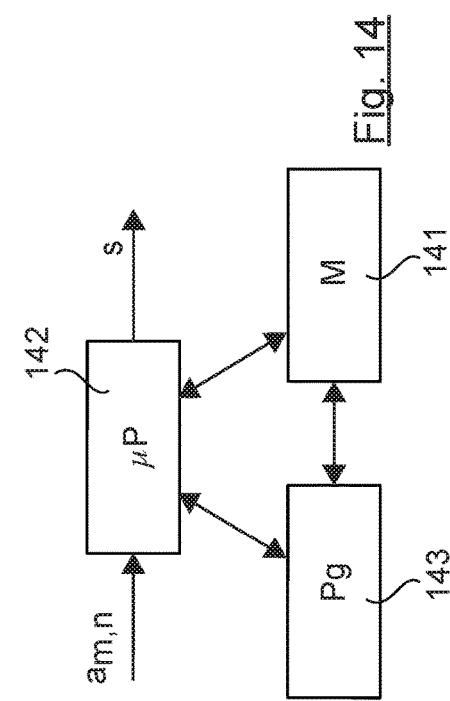
Figure 6:
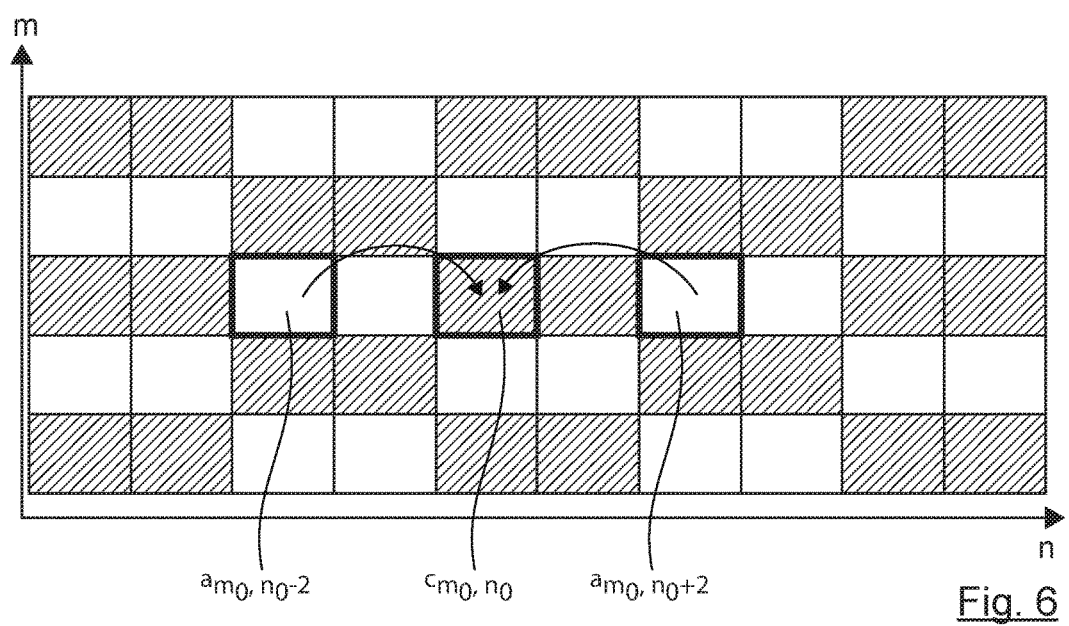
Figure 10:
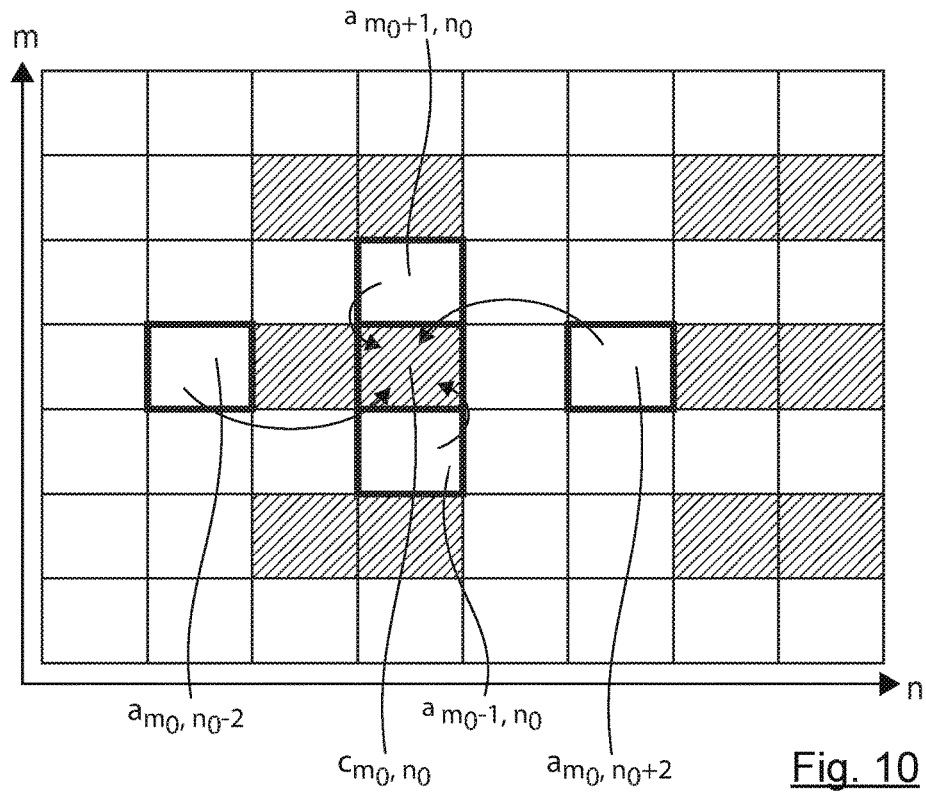
Figure 9:
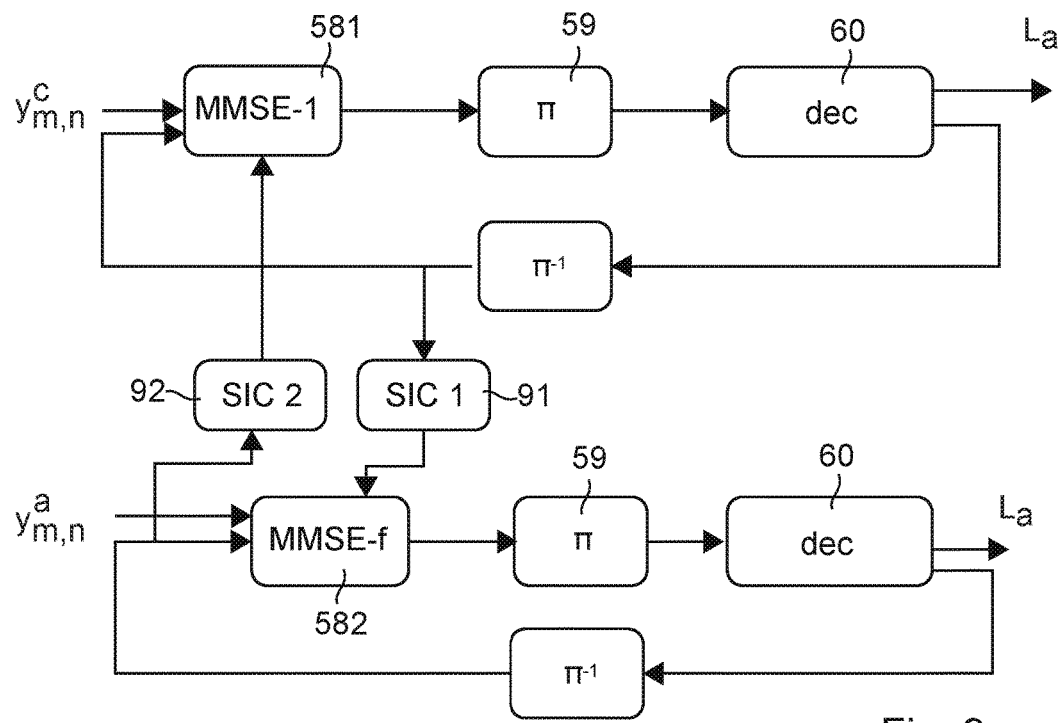
Figure 11:
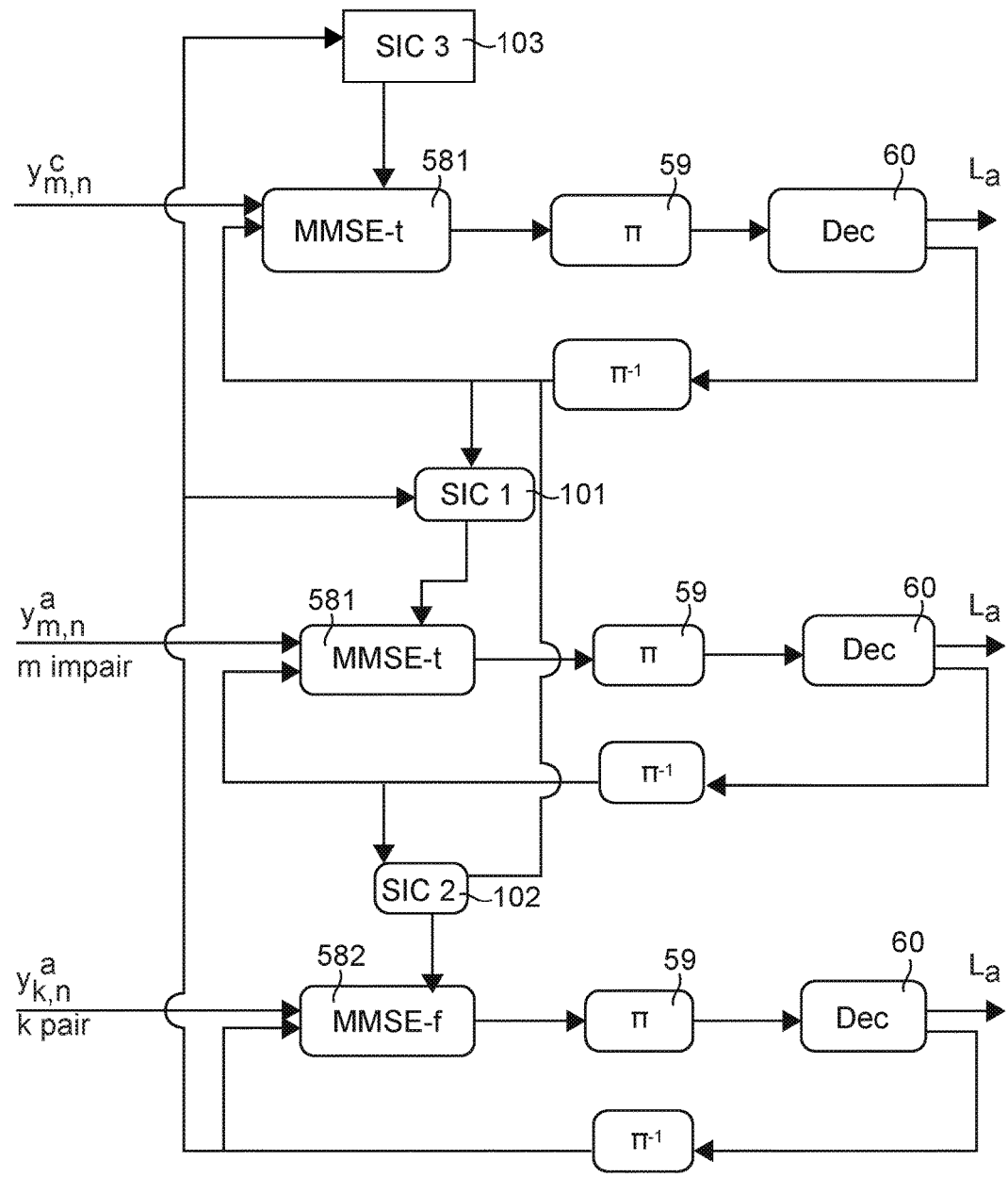
Figure 12:
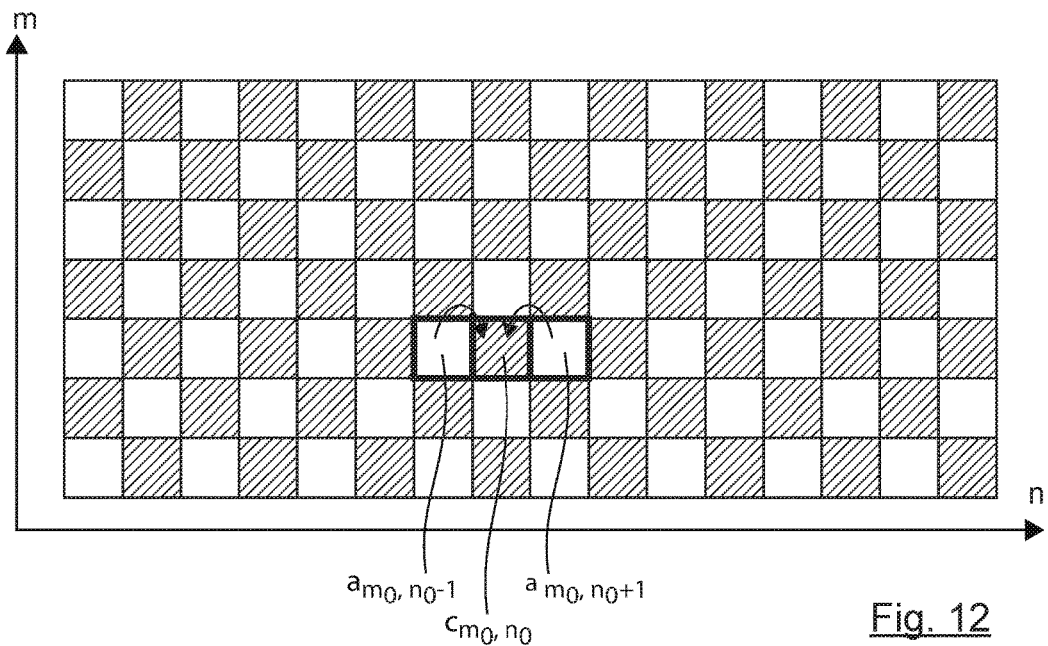
Figure 13:
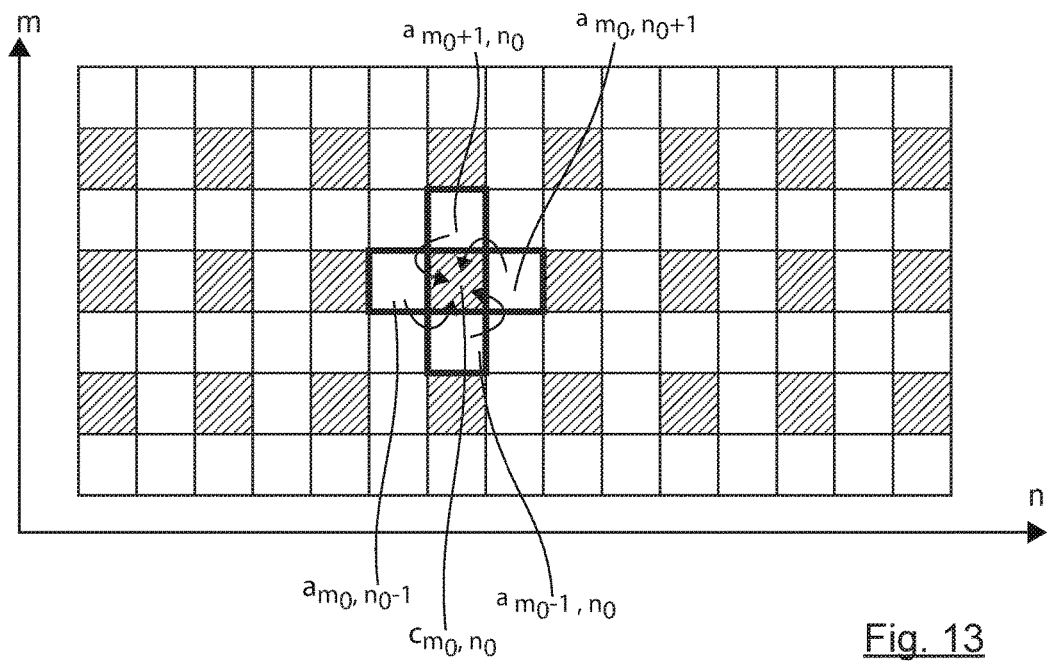

FIGS. 6, 8, and 10 provide examples of transmission patterns making it possible to reduce the intersymbol, intercarrier, or intersymbol and intercarrier interference respectively, in an FTN/OQAM transmission system;

FIGS. 7, 9 and 11 depict examples of receivers making it possible to receive a multicarrier signal using the transmission pattern of FIGS. 6, 8 and 10 respectively;

FIGS. 12 and 13 provide examples of transmission patterns making it possible to reduce the intersymbol, or intersymbol and intercarrier interference, respectively, in an FTN/OFDM transmission system;

FIGS. 14 and 15 respectively illustrate the simplified structure of a transmitter implementing a technique of generating a multicarrier signal, and a receiver implementing a technique of receiving according to a particular embodiment of the invention.

5. DESCRIPTION OF AN EMBODIMENT OF THE INVENTION

5.1 General Principle

The general principle of the invention is based on the precoding of at least one symbol modulating a carrier of a multicarrier signal, by modifying its value for taking into account, on transmission, intersymbol ISI and/or intercarrier ICI, interference normally affecting this symbol. The invention thus provides for at least partially precanceling intersymbol and/or intercarrier interference for at least one symbol.

Such a technique may in particular be implemented for data transmission at a faster-than-Nyquist rate.

It is therefore provided according to the invention for at least partially precanceling, on transmission, ISI and $ICI_n$ interference since they are known to the transmitter. Thus, instead of transmitting symbols $a_{m,n}$, precoded symbols $c_{m,n}$ may be transmitted such that:

$$c_{m,n} = a_{m,n} - \alpha ISI - \beta ICI_n$$

It is to be noted first of all that for a symbol $a_{m,n}$, the symbols $a_{m,n+p}$ and $a_{m,n-p}$ participate in ISI, and the symbols $a_{m+q,n}$ and $a_{m-q,n}$ participate in ICI, with p, $q \in \Re^+$, $p \in [-l, l]$ and $q \in [-l', l']$. It is therefore not possible to precode the whole set of symbols, i.e. to precancel the interference of all the symbols.

The values of l and l' may be determined from at least one element belonging to the group including: the length of the prototype filter used, the compression factor $\tau$ and the type of modulation.

In order to limit the reduction in the power of the useful symbol $a_{m,n}$, two factors $\alpha$ and $\beta$ are introduced making it possible to select the type of interference that it is desired to at least partially cancel thanks to the precoding, and a first subset of precoded symbols $c_{m,n} = a_{m,n} - \alpha ISI - \beta ICI_n$ is transmitted in a first part of the frame. In the rest of the frame, a second subset of non-precoded symbols $a_{m,n}$ is transmitted.

This technique of at least partially precanceling interference may be designated as an SIPC precoding technique, or "Sparse Interference Pre-Cancellation", in English.

This technique has many advantages.

In particular, comparing the bit error rate (BER) curves as a function of the signal-to-noise ratio (SNR) for an FTN/OQAM system with and without precoding shows a faster convergence of the system with precoding. For example, in the case of a 64-QAM modulation, the system begins to converge from iteration 3.

The precoding technique according to the invention also makes it possible to reduce the value of $\tau$ to 0.7 for a 16-QAM modulation, or to 0.8 for a 64-QAM modulation, which allows transmission of a greater volume of information over a given period.

Figure 3:
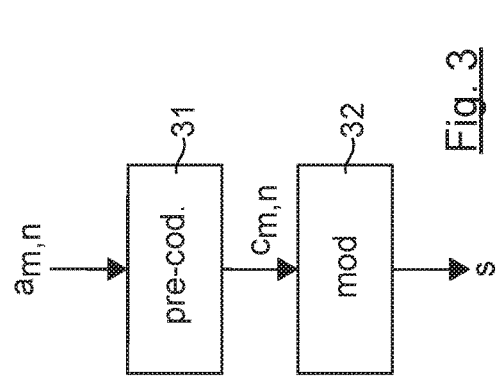
FIG. 3 illustrates the main steps implemented by a method of generating a multicarrier signal according to a particular embodiment of the invention.

FIG. 3 illustrates the main steps implemented by a method of generating a multicarrier signal according to an embodiment of the invention.

Such a method receives a set of symbols $a_{m,n}$ as input which may be real values or complex values.

In the course of a first step 31, a first subset of symbols of the set of symbols is precoded. Thus a first subset of K precoded symbols, denoted by $c_{m,n}$, is thus obtained. As already mentioned, the step of precoding modifies the value of a symbol of the first subset for taking account of interference generated by at least one other symbol of the set of symbols intended to be transmitted at the same instant or at the same frequency according to a predetermined time/frequency transmission pattern.

In the course of a second step 32, the set of carriers is modulated, e.g. in the form of a frame of M×N carriers, from the first subset of precoded symbols and a second subset of non-precoded symbols, of the set of symbols, delivering said multicarrier signal s. The step of modulating modulates each carrier of the set of carriers by a precoded symbol of the first subset or by a non-precoded symbol of the second subset, according to the predetermined transmission pattern.

The frame of M×N carriers is therefore composed of precoded symbols and non-precoded symbols respecting a particular transmission pattern.

Figure 4:
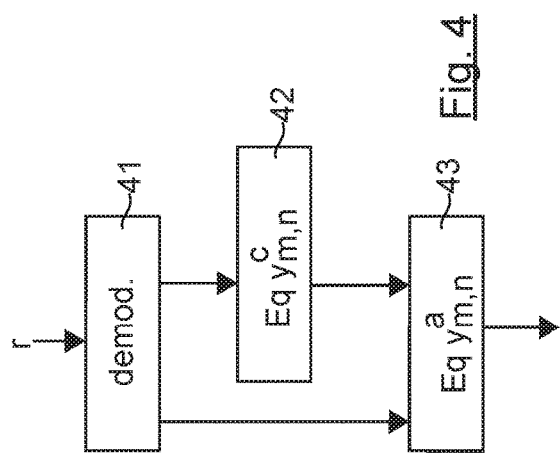
FIG. 4 illustrates the main steps implemented by a method of receiving a multicarrier signal according to a particular embodiment of the invention.

FIG. 4 illustrates the main steps implemented by a method of receiving according to an embodiment of the invention.

Such a method receives the multicarrier signal as input, after passage in a transmission channel.

In the course of a first step 41, the received multicarrier signal r is demodulated, delivering a first subset of demodulated symbols corresponding to the precoded symbols, referred to as demodulated precoded symbols $y_{m,n}^c$, and a second subset of demodulated symbols corresponding to the non-precoded symbols, referred to as demodulated non-precoded symbols $y_{m,n}^a$.

In the course of a second step 42, the demodulated precoded symbols $y_{m,n}^c$ are time and/or frequency equalized.

Then in the course of a next step 43, the demodulated non-precoded symbols $y_{m,n}^a$ are equalized in time and/or in frequency, taking into account an estimate of interference affecting the demodulated non-precoded symbols, obtained from the demodulated non-precoded symbols, delivering equalized demodulated non-precoded symbols.

Examples of implementation of the invention are described below in relation to FIG. 5, for an FTN/OQAM or FTN/OFDM type modulation.

5.2 First Embodiment: FTN/OQAM Type Modulation

Figure 5:
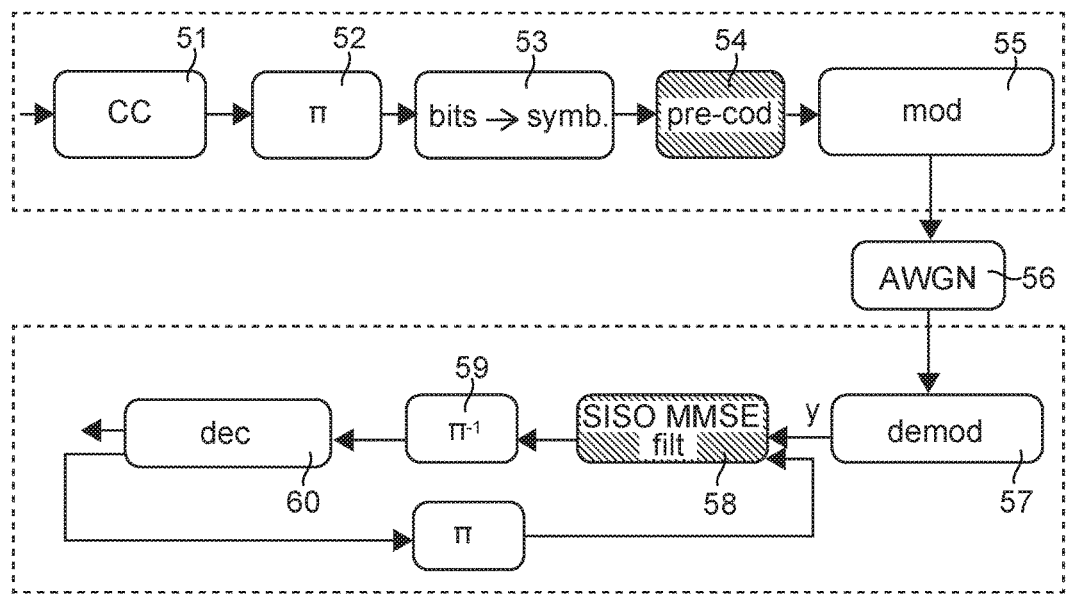
FIG. 5 depicts an example of an FTN transmission system according to a particular embodiment of the invention.

FIG. 5 illustrates an example of a transmission system for an FTN/OQAM transmission according to an embodiment of the invention.

On transmission, the bits of a source signal are first coded by a channel coder CC 51, which represents e.g. a convolutional code, and interleaved by an interleaver π 52. The interleaved coded bits are then mapped to OQAM symbols, in a mapping module 53, using, for example, the Gray mapping technique. A set of symbols is thus obtained.

According to an embodiment of the invention, one part of these symbols, again referred to as the first subset, is precoded in a precoding module 54, the other part, again referred to as the second subset, is not precoded.

For example, the precoding module 54 delivers, for each symbol $a_{m_0,n_0}$ of the first subset, a precoded symbol $c_{m_0,n_0}$ intended to modulate a carrier at the location $(m_0,n_0)$ in the predetermined transmission pattern, such that:

$$c_{m_0,n_0} = \begin{cases} (a_{m_0,n_0} - \alpha ISI \text{ (if } \beta = 0 \text{ and } n_0 = k\bmod(l+2) \text{ and } n_0 = (k+1)\bmod(l+2), (k \in N \text{ and } k \leq l+1)) \\ (a_{m_0,n_0} - \beta ICI, \text{ if } (\alpha = 0 \text{ and } m_0 = k\bmod(l'+1), (k \in N \text{ and } k \leq l'))) \\ (a_{m_0,n_0} - \alpha ISI - \beta ICI \text{ if } (m_0 = k\bmod(l'+1), (k \in N \text{ and } k \leq l')) \text{ and} \\ n_0 = k'\bmod(l+2) \text{ and } n_0 = (k'+1)\bmod(l+2), (k' \in N \text{ and } k' \leq l+1)) \end{cases}$$

Each of these lines corresponds to a different case of precoding, making it possible to partially cancel the ISI (SIPC in time, first line), the ICI (SIPC in frequency, second line), or the ISI and the ICI (SIPC in time-frequency, third line).

The other symbols $a_{m,n}$, belonging to the second subset, are not precoded.

The carriers of the multicarrier signal are then modulated with the precoded OQAM symbols of the first subset and the non-precoded OQAM symbols of the second subset in an FTN-OQAM modulator 55.

After passage in an AWGN channel 56, the received signal is first demodulated by an FTN-OQAM demodulator 57.

The symbols coming from the FTN-OQAM demodulator 57 are then filtered by a specific SISO MMSE filter 58, deinterleaved by a deinterleaver $\pi^{-1}$ 59, then decoded by a decoder 60.

For example, a receiver based on the principle of turbo equalization is considered. The information coming from the decoder 60 is therefore used for updating the SISO MMSE filter 58, by communicating thereto logarithmic likelihood ratio type information (LLRs) $L_a(x)$ as detailed below.

A) Precoding in Time ($\alpha \neq 0$, $\beta = 0$)

As already mentioned, it is found that, for a symbol $a_{m,n}$, the symbols $a_{m,n+p}$ and $a_{m,n-p}$ participate in the ISI, and the symbols $a_{m+q,n}$ and $a_{m-q,n}$ participate in the ICI, with p, q ∈ $\mathfrak{R}^+$, p∈[-1,1] and q∈[1', 1'].

According to a first example, it is sought to cancel, or at the very least reduce, only the intersymbol interference ISI, by precoding a first subset of OQAM symbols. This technique is denoted by SIPC precoding in time. It is to be noted that, for canceling or reducing the ISI, on each carrier m, the positions of the symbols to be precoded may be chosen independently of the other carriers.

As illustrated in FIG. 6, according to this first example a transmission pattern is considered corresponding to an alternation in time of two precoded symbols, hatched, and two non-precoded symbols, not hatched, and an alternation in frequency of one precoded symbol, hatched, and one non-precoded symbol, not hatched, for reducing the intersymbol interference.

More specifically, it is assumed that, for a symbol $a_{m_0,n_0}$ at instant $n_0$ and the carrier $m_0$, the ISI is mainly generated by the two neighboring symbols $a_{m_0,n_0+2}$ and $a_{m_0,n_0-2}$. Therefore it is chosen to place two consecutive precoded symbols for each value of m, by alternating two precoded symbols and two non-precoded symbols. It is also chosen to alternate the positions of the precoded symbols for even m and for odd m. Indeed, for a symbol $a_{m_0,n_0}$ at instant $n_0$ and the carrier $m_0$, the interference generated by the carrier $m_0+1$ and $m_0-1$ diminishes as a function of n.

It is to be noted that if it is assumed that the ISI is generated mainly by the four neighboring symbols $a_{m_0,n_0+4}$, $a_{m_0,n_0+2}$, $a_{m_0,n_0-2}$, $a_{m_0,n_0-4}$, it is chosen to place two consecutive precoded symbols for each value of m, by alternating two precoded symbols and four non-precoded symbols. An alternation of the positions of the precoded symbols for even m and for odd m is retained.

As mentioned above, a first subset of symbols is precoded in the course of a step of precoding 54 for canceling, or at the very least reducing, the intersymbol interference:

$$c_{m,n} = a_{m,n} - \alpha ISI$$

with, for an FTN/OQAM modulation:

$$ISI = \Re\left\{\sum_{n \neq n_0} a_{m_0,n} e^{\frac{j\pi}{2}(n-n_0)} \sum_k g[k-nN_f]g[k-n_0 N_f] e^{\frac{j2\pi(k-\frac{D}{2})(m-m_0)}{M}}\right\}$$

using the notations given with the FTN/OQAM modulations according to the prior art.

If it is assumed that, for a symbol $a_{m_0,n_0}$, the ISI is mainly generated by the two neighboring symbols $a_{m_0,n_0+2}$ and $a_{m_0,n_0-2}$, the equivalent channel of the ISI may be represented by $h=[h_{-1}\ 0\ 1\ 0\ h_1]$, with $h_{-1}=h_1$ for a symmetrical channel. If it is assumed that the ISI is generated by four neighboring symbols, the equivalent channel of the ISI may be represented by $h=[h_2\ 0\ h_1 0\ 1\ 0\ h_1\ 0\ h_2]$. It is to be noted that the symbols in the odd n positions do not contribute to the ISI since the OQAM modulation takes the real part of the received signal.

Continuing with the example in FIG. 6, the symbol $a_{m_0,n_0}$ at the position $(m_0,n_0)$ is precoded to take account of the ISI. Considering the equivalent channel model of the ISI, the precoded symbol $c_{m_0,n_0}$ at the position $(m_0, n_0)$ is such that:

$$c_{m_0,n_0} = a_{m_0,n_0} - h_1 a_{m_0,n_0-2} - h_1 a_{m_0,n_0+2}$$

The multicarrier signal therefore includes carriers modulated by precoded symbols, and carriers modulated by non-precoded symbols.

It should be observed that the power of the carriers modulated by precoded symbols is less than the power of the carriers modulated by non-precoded symbols.

On reception, without taking into account the ICI and the noise, the precoded symbol received at the position $(m_0, n_0)$ after demodulation, denoted by $y_{m_0,n_0}^c$, is such that:

$$y_{m_0,n_0}^c = c_{m_0,n_0} + h_1 a_{m_0,n_0-2} + h_1 a_{m_0,n_0+2} = a_{m_0,n_0}$$

Without taking into account the ICI and the noise, a non-precoded symbol received at the position $(m_i, n_i)$ after demodulation, denoted by $y_{m_i,n_i}^a$, is such that:

$$y_{m_i,n_i}^a = a_{m_i,n_i} + h_1 a_{m_i,n_i-2} + h_1 c_{m_i,n_i+2}$$

$$y_{m_i,n_i}^a = a_{m_i,n_i} + h_1 a_{m_i,n_i-2} - h_1^2 a_{m_i,n_i-4} - h_1^2 a_{m_i,n_i} + h_1 a_{m_i,n_i+2} - h_1^2 a_{m_i,n_i} - h_1^2 a_{m_i,n_i+4}$$

$$y_{m_i,n_i}^a = (1-2*h_1^2) a_{m_i,n_i} + h_1 a_{m_i,n_i-2} - h_1^2 a_{m_i,n_i-4} + h_1 a_{m_i,n_i+2} h_1^2 a_{m_i,n_i+4}$$

A reduction is found here in the power of the useful symbol $a_{m_i,n_i}$ represented by the factor $(1-2*h_1^2)$, partially offset by the introduction of the selection factors α et β.

Therefore first of all the demodulated precoded symbols, then the demodulated non-precoded symbols, are equalized, by taking into account interference affecting the non-precoded symbols determined from the equalization of the precoded symbols.

FIG. 7 illustrates an example of a receiver according to an embodiment of the invention, implementing at least one decoding iteration.

In the course of a first decoding iteration, the demodulated precoded symbols $y_{m,n}^c$ are equalized with an MMSE-t equalizer 581 in time. The equalized demodulated precoded symbols are interleaved by the interleaver 59, and decoded by the decoder 60. For example, such a decoder is of the Max-Log-MAP type providing soft information in terms of maximum likelihood ratio (LLR), that is used for constructing soft symbols. A first estimate is therefore obtained of the precoded symbols $\hat{y}_{m,n}^c$ at the output of the first decoding iteration ($=\hat{a}_{m,n}$ at the positions corresponding to the precoded symbols).

This information in terms of LLR allows a first interference cancellation module SIC 1 ("Soft Interference Cancellation") 71 of the receiver to determine the intersymbol interference generated by the precoded symbols on the non-precoded symbols on the same carrier of index m. This SIC 1 module 71 also determines the intercarrier interference generated by the symbols of the other carriers on the carrier of index m. The receiver therefore also makes it possible to cancel, or reduce, a part of the interference.

In the course of the first decoding iteration, the demodulated non-precoded symbols $y_{m,n}^a$ are equalized with an MMSE-t equalizer 581 in time, by taking into account the interference determined by the first SIC 1 module 71. The equalized demodulated non-precoded symbols are interleaved by the interleaver 59, and decoded by the decoder 60. For example, such a decoder is of the Max-Log-MAP type. A first estimate is therefore obtained of the non-precoded symbols $\hat{y}_{m,n}^a$ at the output of the first decoding iteration ($=\hat{a}_{m,n}$ at the positions corresponding to the non-precoded symbols).

This information in terms of LLR allows a second interference cancellation module SIC 2 72 of the receiver to determine the intersymbol interference generated by the non-precoded symbols on the precoded symbols.

In the course of a second decoding iteration, the equalization of the estimated precoded symbols $\hat{y}_{m,n}^c$ is refined with the MMSE-t equalizer 581 in time, which takes account of the interference determined by the second SIC 2 module 72. The steps of interleaving and decoding are iterated, for obtaining a refined estimate of the precoded symbols at the output of the second decoding iteration and a refined estimate of the interference generated by the precoded symbols on the non-precoded symbols.

The equalization of the estimated non-precoded symbols $\hat{y}_{m,n}^a$ is also refined in the course of a second decoding iteration, with the MMSE-t equalizer 581 in time, by taking into account the refined estimate of the interference generated by the precoded symbols on the non-precoded symbols. The steps of interleaving and decoding are iterated, for obtaining a refined estimate of the non-precoded symbols at the output of the second decoding iteration and a refined estimate of the interference generated by the non-precoded symbols on the precoded symbols.

A plurality of iterations may be implemented until a convergence is obtained in the estimate of the precoded $\hat{y}_{m,n}^c$ and non-precoded symbols $\hat{y}_{m,n}^a$, again denoted by $\hat{a}_{m,n}$.

It is to be noted that for an MMSE-t equalization in time, the SIC module (first or second SIC module) removes, or at the very least reduces, the interference ICI by using the estimated OQAM symbols $\hat{a}_{m,n}$:

$$\hat{y}_{m_0,n_0} = y_{m_0,n_0} - \Re\left\{\sum_{m \neq m_0}\sum_n \hat{a}_{m,n} e^{j\frac{\pi}{2}(m-m_0+n-n_0)} \sum_k g[k-nN_f]g[k-n_0N_f]e^{\frac{j2\pi(k-\frac{D}{2})(m-m_0)}{M}}\right\}$$

It is also to be noted that the MMSE equalization filter used by the MMSE-t equalizer 581 differs from that used for a conventional FTN/OQAM modulation. The equalization filters of the demodulated precoded symbols and demodulated non-precoded symbols must therefore be recalculated.

B) Precoding in Frequency ($\alpha=0$, $\beta \neq 0$)

According to a second example, it is sought to cancel, or at the very least reduce, only the intercarrier interference $ICI_n$, by precoding a first subset of OQAM symbols. This technique is denoted by SIPC precoding in frequency.

As illustrated in FIG. 8, according to this second example a transmission pattern is considered corresponding, in time, either to a series of precoded symbols, hatched, or to a series of non-precoded symbols, not hatched, and, in frequency, to an alternation of one precoded symbol, hatched, and one non-precoded symbol, not hatched, for reducing the intercarrier interference.

More specifically, it is assumed that, for a symbol $a_{m_0,n_0}$ at instant $n_0$ and the carrier $m_0$, the $ICI_n$ is mainly generated by the two neighboring symbols $a_{m_0+1,n_0}$ and $a_{m_0-1,n_0}$. It is chosen to alternate the positions of the precoded symbols for even m and for odd m, for reducing the intercarrier interference.

As mentioned above, a first subset of symbols is precoded in the course of a step of precoding 54 for canceling, or at the very least reducing, the intercarrier interference:

$$c_{m,n} = a_{m,n} - \beta ICI_n$$

with, for an FTN/OQAM modulation:

$$ICI_n = \Re\left\{\sum_{m \neq m_0}\sum_n a_{m,n} e^{j\frac{\pi}{2}(m-m_0+n-n_0)} \sum_k g[k-nN_f]g[k-n_0N_f]e^{\frac{j2\pi(k-\frac{D}{2})(m-m_0)}{M}}\right\}$$

using the notations given with the FTN/OQAM modulations according to the prior art.

The multicarrier signal therefore includes carriers modulated by precoded symbols, and carriers modulated by non-precoded symbols.

On reception, once the multicarrier signal is demodulated, the demodulated precoded symbols, then the demodulated non-precoded symbols, are equalized, by taking into account interference affecting the non-precoded symbols determined from the equalization of the precoded symbols.

FIG. 9 illustrates an example of a receiver according to an embodiment of the invention, implementing at least one decoding iteration.

The modules implemented for estimating the precoded symbols and the non-precoded symbols are similar to those illustrated in FIG. 7, replacing the MMSE-t equalizer in time used for equalizing the demodulated non-precoded symbols by an MMSE-f equalizer 582 in frequency. Indeed, as the intercarrier interference term $ICI_n$, depends on time, the equivalent channel in time of the non-precoded symbols also depends on time. Therefore it is chosen to equalize the demodulated non-precoded symbols in frequency (on the m axis). The operation of the receiver is therefore not detailed again here.

It is to be noted that for an MMSE-f equalization in frequency, the SIC 1 module 91 eliminates, or at the very least reduces, the interference by using the estimated OQAM symbols $\hat{a}_{m,n}$:

$$\hat{y}_{m_0,n_0} = y_{m_0,n_0} - \Re\left\{\sum_{n \neq n_0}\sum_m \hat{a}_{m,n} e^{j\frac{\pi}{2}(m-m_0+n-n_0)} \sum_k g[k-nN_f]g[k-n_0N_f]e^{\frac{j2\pi(k-\frac{D}{2})(m-m_0)}{M}}\right\}$$

The SIC 2 module 92, like the SIC 2 module 72, eliminates, or at the very least reduces, the intercarrier interference generated by the carriers modulated by non-precoded symbols on the carriers modulated by precoded symbols.

C) Precoding in Time and in Frequency ($\alpha \neq 0$, $\beta \neq 0$)

According to a third example, it is sought to cancel, or at the very least reduce, the intersymbol interference ISI and the intercarrier interference $ICI_n$, by precoding a first subset of OQAM symbols. This technique is denoted by SIPC precoding in time-frequency.

As illustrated in FIG. 10, according to this third example a transmission pattern is considered corresponding, in time, to an alternation of two precoded symbols of two non-precoded symbols, and, in frequency either to an alternation of one precoded symbol and one non-precoded symbol, or to a series of non-precoded symbols, for reducing the intersymbol and intercarrier interference.

More specifically, it is assumed that, for a symbol $a_{m_0,n_0}$ at instant $n_0$ and the carrier $m_0$, the ISI is mainly generated by the two neighboring symbols $a_{m_0,n_0+2}$ and $a_{m_0,n_0-2}$. Therefore it is chosen to place two consecutive precoded symbols for each value of m, by alternating two precoded symbols and two non-precoded symbols. It is also assumed that the $ICI_n$ is generated mainly by the two neighboring symbols $a_{m_0+1,n_0}$ and $a_{m_0-1,n_0}$. It is therefore chosen to alternate the positions of the precoded symbols for even m and for odd m.

As mentioned above, a first subset of symbols is precoded in the course of a step of precoding 54 for canceling, or at the very least reducing, the intersymbol interference:

$$c_{m,n} = a_{m,n} - \alpha ISI - \beta ICI_n$$

using the values previously defined for the ISI and the ICI for the FTN/OQAM transmissions.

The multicarrier signal therefore includes carriers modulated by precoded symbols, and carriers modulated by non-precoded symbols.

On reception, once the multicarrier signal is demodulated, the demodulated precoded symbols, then the demodulated non-precoded symbols, are equalized, by taking into account interference affecting the non-precoded symbols determined from the equalization of the precoded symbols.

FIG. 11 illustrates an example of a receiver according to an embodiment of the invention, implementing at least one decoding iteration.

In the course of a first decoding iteration, the demodulated precoded symbols $y_{m,n}^c$ are equalized with an MMSE-t equalizer 581 in time. The equalized demodulated precoded symbols are interleaved by the interleaver 59, and decoded by the decoder 60. For example, such a decoder is of the Max-Log-MAP type providing soft information in terms of maximum likelihood ratio (LLR), that is used for constructing soft symbols. A first estimate is therefore obtained of the precoded symbols $\hat{y}_{m,n}^c$ at the output of the first decoding iteration ($=\hat{a}_{m,n}$ at the positions corresponding to the precoded symbols).

This information in terms of LLR allows a first interference cancellation module SIC 1 111 of the receiver to determine the intersymbol interference generated by the precoded symbols on the non-precoded symbols.

In the course of the first decoding iteration, then the demodulated non-precoded symbols $y_{m,n}^a$ carried by the same frequency as the precoded symbols are equalized, e.g. odd m with an MMSE-t equalizer 581 in time, by taking into account the interference determined by the first SIC 1 module 111. The demodulated non-precoded symbols equalized with odd m are interleaved by the interleaver 59, and decoded by the decoder 60. For example, such a decoder is of the Max-Log-MAP type, that is used for constructing soft symbols. A first estimate is therefore obtained of the non-precoded symbols $\hat{y}_{m,n}^a$ with odd m at the output of the first decoding iteration ($=\hat{a}_{m,n}$ at the positions corresponding to the non-precoded symbols with odd m).

This information in terms of LLR allows a second interference cancellation module SIC 2 112 of the receiver to determine the intercarrier interference generated by all the symbols of a carrier of odd index m on the non-precoded symbols of a carrier of even index k (the SIC 2 module uses the estimated precoded symbols and the estimated non-precoded symbols of the carrier of odd index m for canceling the interference that they generate on the carrier of even index k).

In the course of the first decoding iteration, then the demodulated non-precoded symbols $y_{k,n}^a$ carried by another frequency than the precoded symbols e.g. even k are equalized, with an MMSE-f equalizer 582 in frequency, by taking into account the interference determined by the second SIC 2 module 112. The demodulated non-precoded symbols equalized with even k are interleaved by the interleaver 59, and decoded by the decoder 60. For example, such a decoder is of the Max-Log-MAP type. A first estimate is therefore obtained of the non-precoded symbols $\hat{y}_{k,n}^a$ with even k at the output of the first decoding iteration ($=\hat{a}_{m,n}$ at the positions corresponding to the non-precoded symbols with even m).

Optionally, this information in terms of LLR allows a third interference cancellation module SIC 3 103 to determine the interference caused by the non-precoded symbols of the carrier of even index k, on the precoded symbols of the carrier of odd index m.

A plurality of iterations may be implemented until a convergence is obtained in the estimate of the precoded $\hat{y}_{m,n}^c$ and non-precoded symbols $\hat{y}_{m,n}^a$, with even m and odd m, again denoted by $\hat{a}_{m,n}$.

As mentioned above, for an MMSE-t equalization in time or MMSE-f in frequency an SIC module eliminates, or at the very least reduces, the interference by using the previously estimated symbols $\hat{a}_{m,n}$.

5.3 Second Embodiment: FTN/OFDM Type Modulation

The transmission system illustrated in FIG. 5 may be used for an FTN/OFDM transmission according to an embodiment of the invention, by replacing the OQAM modulator 55 with an OFDM modulator.

On transmission, the bits of a source signal are first coded by a channel coder CC, which represents e.g. a convolutional code, and interleaved by an interleaver it. The interleaved coded bits are then mapped to QAM symbols, in a mapping module, using, for example, the Gray mapping technique. A set of symbols is thus obtained.

According to an embodiment of the invention, one part of these symbols, again referred to as the first subset, is precoded in a precoding module, the other part, again referred to as the second subset, is not precoded.

For example, the precoding module delivers, for each symbol $a_{m_0,n_0}$ of the first subset, a precoded symbol $c_{m_0,n_0}$ intended to modulate a carrier at the location $(m_0,n_0)$ in the predetermined transmission pattern, such that:

$$c_{m_0,n_0} = \begin{cases} (a_{m_0,n_0} - \alpha ISI) & \text{if } (\beta = 0 \text{ and } n_0 = k\mathrm{mod}(l'+1), (k \in \mathbb{N} \text{ and } k \leq l'))) \\ (a_{m_0,n_0} - \beta ICI) & \text{if } (\alpha = 0 \text{ and } m_0 = k\mathrm{mod}(l+1), (k \in \mathbb{N} \text{ and } k \leq l))) \\ (a_{m_0,n_0} - \alpha ISI - \beta ICI) & \text{if } (m_0 = k\mathrm{mod}(l+1), \text{ and } n_0 = k'\mathrm{mod}(l'+1), (k, k' \in \mathbb{N}, k \leq l \text{ and } k' \leq l'))) \end{cases}$$

Each of these lines corresponds to a different case of precoding, making it possible to partially cancel the ISI (SIPC in time, first line), the ICI (SIPC in frequency, second line), or the ISI and the ICI (SIPC in time-frequency, third line).

The other symbols $a_{m,n}$, belonging to the second subset, are not precoded.

The carriers of the multicarrier signal are then modulated with the precoded QAM symbols of the first subset and the non-precoded QAM symbols of the second subset in an FTN-OFDM modulator.

After passage in an AWGN channel, the received signal is first demodulated by an FTN-OFDM demodulator.

The symbols coming from the FTN-OFDM demodulator are then filtered by a specific SISO MMSE filter, deinterleaved by a deinterleaver $\pi^{-1}$, then decoded by a decoder.

For example, a receiver based on the principle of turbo equalization is considered. The information coming from the decoder is therefore used for updating the SISO MMSE filter, by communicating thereto logarithmic likelihood ratio type information (LLRs) $L_a(x)$ as detailed below.

A) Precoding in Time ($\alpha \neq 0$, $\beta = 0$)

As for OFDM/OQAM, according to a first example it is sought to cancel, or at the very least reduce, only the intersymbol interference ISI, by precoding a first subset of QAM symbols. It is to be noted that, for canceling or reducing the ISI, on each carrier m, the positions of the symbols to be precoded may be chosen independently of the other carriers.

As illustrated in FIG. 12, according to this first example a transmission pattern is considered corresponding to an alternation in time of one precoded symbol, hatched, and one non-precoded symbol, not hatched, and an alternation in frequency of one precoded symbol, hatched, and one non-precoded symbol, not hatched, for reducing the intersymbol interference.

As mentioned above, a first subset of symbols is precoded in the course of a step of precoding for canceling, or at the very least reducing, the intersymbol interference:

$$c_{m,n} = a_{m,n} - \alpha ISI$$

with, for an FTN/OFDM modulation:

$$ISI = \sum_{\substack{n=n_0-\left(\left[\frac{M}{N_f}\right]-1\right) \\ n \neq n_0}}^{n_0+\left(\left[\frac{M}{N_f}\right]-1\right)} M e^{\frac{j2\pi N_f m_0(n-n_0)}{M}} a_{m_0,n}$$

using the notations given with the FTN/OFDM modulations according to the prior art.

If it is assumed that, for a symbol $a_{m_0,n_0}$, the ISI is generated mainly by the 21 neighboring symbols $a_{m_0,n_0-p}$, for $p \in [-l, l]$, where $$l = \left[\frac{L}{N_f}\right]$$

and [.] represents the entire part operator and L is the length of the prototype filter used, the equivalent channel of the ISI may be represented by $h = [h_{-l}, \ldots, h_{-1}, 1, h_1, \ldots, h_l]$. By considering the equivalent channel model of the ISI, the precoded symbol $c_{m_0,n_0}$ at the position $(m_0, n_0)$ is such that:

$$c_{m_0,n_0} = a_{m_0,n_0} - \sum_{i=-l, i \neq 0}^{l} h_i a_{m_0,n_0-i}$$

It is considered, for example, as illustrated in FIG. 12, that $l=1$.

The multicarrier signal therefore includes carriers modulated by precoded symbols, and carriers modulated by non-precoded symbols.

On reception, without taking into account the ICI and the noise, the precoded symbol received at the position $(m_0, n_0)$ after demodulation, denoted by $y^c_{m_0,n_0}$, is such that:

$$y^c_{m_0,n_0} = c_{m_0,n_0} + \sum_{i=-l, i \neq 0}^{l} h_i a_{m_0,n_0-i} = a_{m_0,n_0}$$

Therefore first of all the demodulated precoded symbols, then the demodulated non-precoded symbols, are equalized, by taking into account interference affecting the non-precoded symbols determined from the equalization of the precoded symbols.

The receiver implemented for receiving and decoding the multicarrier signal is similar to that of FIG. 7. Its operation is therefore not described again.

B) Precoding in Frequency ($\alpha = 0$, $\beta \neq 0$)

According to a second example, it is sought to cancel, or at the very least reduce, only the intercarrier interference $ICI_n$, by precoding a first subset of QAM symbols.

The transmission pattern in this case is similar to that illustrated in FIG. 8, corresponding to a series in time of precoded symbols or non-precoded symbols, and an alternation in frequency of one precoded symbol and one non-precoded symbol, for reducing the intercarrier interference. It is also assumed that, for a symbol $a_{m_0,n_0}$ at instant $n_0$ and the carrier $m_0$, the $ICI_n$ is mainly generated by the two neighboring symbols $a_{m_0+1,n_0}$ and $a_{m_0-1,n_0}$.

As mentioned above, a first subset of symbols is precoded in the course of a step of precoding for canceling, or at the very least reducing, the intercarrier interference:

$$c_{m,n} = a_{m,n} - \beta ICI_n$$

with, for an FTN/OFDM modulation:

$$ICI_n = \sum_{m \neq m_0} \sum_{n_0-\left(\left[\frac{M}{N_f}\right]-1\right)}^{n_0+\left(\left[\frac{M}{N_f}\right]-1\right)} a_{m,n} \sum_{k} e^{\left(\frac{j2\pi\left(k-\frac{M-1}{2}\right)(m-m_0)}{M}\right)} e^{\frac{j2\pi N_f(n_0 m_0 - nm)}{M}}$$

using the notations given with the FTN/OFDM modulations according to the prior art.

The multicarrier signal therefore includes carriers modulated by precoded symbols, and carriers modulated by non-precoded symbols.

On reception, once the multicarrier signal is demodulated, the demodulated precoded symbols, then the demodulated non-precoded symbols, are equalized, by taking into account interference affecting the non-precoded symbols determined from the equalization of the precoded symbols.

The receiver implemented for receiving and decoding the multicarrier signal is similar to that of FIG. 9. Its operation is therefore not described again.

C) Precoding in Time and in Frequency ($\alpha \neq 0$, $\beta \neq 0$)

According to a third example, it is sought to cancel, or at the very least reduce, the intersymbol interference ISI and the intercarrier interference $ICI_n$, by precoding a first subset of QAM symbols.

As illustrated in FIG. 13, according to this third example a transmission pattern is considered corresponding, in time, either to an alternation of one precoded symbol and one non-precoded symbol, or to a series of non-precoded symbols, and, in frequency, either to an alternation of one precoded symbol and one non-precoded symbol, or to a series of non-precoded symbols, for reducing the intersymbol and intercarrier interference.

More specifically, it is assumed that, for a symbol $a_{m_0,n_0}$ at instant $n_0$ and the carrier $m_0$, the ISI is mainly generated by the two neighboring symbols $a_{m_0,n_0-1}$ and $a_{m_0,n_0+1}$. It is also assumed that the $ICI_n$ is generated mainly by the two neighboring symbols $a_{m_0+1,n_0}$ and $a_{m_0-1,n_0}$.

As mentioned above, a first subset of symbols is precoded in the course of a step of precoding for canceling, or at the very least reducing, the intersymbol interference:

$$c_{m,n}=a_{m,n}-\alpha ISI-\beta ICI_n$$

using the values previously defined for the ISI and the $ICI_n$ for the FTN/OFDM transmissions.

The multicarrier signal therefore includes carriers modulated by precoded symbols, and carriers modulated by non-precoded symbols.

On reception, once the multicarrier signal is demodulated, the demodulated precoded symbols, then the demodulated non-precoded symbols, are equalized, by taking into account interference affecting the non-precoded symbols determined from the equalization of the precoded symbols.

The receiver implemented for receiving and decoding the multicarrier signal is similar to that of FIG. 11. Its operation is therefore not described again.

5.4 Devices

Finally, in relation to FIGS. 14 and 15 respectively a description is given of the simplified structure of a transmitter implementing a technique of generating a multicarrier signal according to an embodiment of the invention, and the structure of a receiver implementing a technique of receiving a multicarrier signal according to an embodiment of the invention.

As illustrated in FIG. 14, such a transmitter, or device for generating a multicarrier signal, includes a memory 141 including a buffer memory, a processing unit 142, provided, for example, with a microprocessor µP, and driven by an application or a computer program 143, implementing the steps of the method of generating according to an embodiment of the invention.

On initialization, the code instructions of the computer program 143 are, for example, loaded into a RAM memory before being executed by the processor of the processing unit 142. The processing unit 142 receives real or complex symbols $a_{m,n}$ at the input. The microprocessor of the processing unit 142 implements the steps of the method of generating previously described, according to the instructions of the computer program 143, for generating a multicarrier signal s.

As illustrated in FIG. 15, a receiver, or receiving device, in its turn includes a memory 151 including a buffer memory, a processing unit 152, provided, for example, with a microprocessor µP, and driven by an application or a computer program 153, implementing the steps of the method of receiving according to an embodiment of the invention.

On initialization, the code instructions of the computer program 153 are, for example, loaded into a RAM memory before being executed by the processor of the processing unit 152. The processing unit 152 receives a received multicarrier signal r at the input. The microprocessor of the processing unit 152 implements the steps of the method of receiving previously described, according to the instructions of the computer program 153, for estimating the transmitted symbols.

The invention claimed is:

1. A method of generating a multicarrier signal, from a set of symbols, characterized in that it includes:
    a step of precoding (31) a first subset of symbols of said set of symbols, delivering a first subset of precoded symbols,
        said step of precoding (31) modifying the value of a symbol of said first subset for taking account of interference generated on this symbol by at least one other symbol of said set of symbols intended to be transmitted at the same instant or at the same frequency according to a predetermined time/frequency transmission pattern, and
    a step of modulating (32) a set of carriers from said first subset of precoded symbols and a second subset of non-precoded symbols of said set of symbols, delivering said multicarrier signal,
        said step of modulating (32) modulating each carrier of said set of carriers by a precoded symbol of said first subset or by a non-precoded symbol of said second subset according to said predetermined transmission pattern.

2. The method as claimed in claim 1, characterized in that said multicarrier signal is formed of a temporal succession of multicarrier symbols intended to be transmitted at a faster-than-Nyquist rate.

3. The method as claimed in claim 1, characterized in that the number of precoded symbols of said first subset is less than or equal to the number of non-precoded symbols of said second subset.

4. The method as claimed in claim 1, characterized in that said step of modulating (32) implements a faster than nyquist/orthogonal frequency division multiplex/offset quadrature amplitude modulation (FTN-OQAM) type modulation, and in that said step of precoding (31) delivers, from a symbol $a_{m_0,n_0}$ of the set of symbols, a precoded symbol $c_{m_0,n_0}$ intended to modulate a carrier at the location $(m_0,n_0)$ in said predetermined transmission pattern, such that:

$$c_{m_0,n_0} = \begin{cases} (a_{m_0,n_0} - \alpha ISI \text{ (if } \beta = 0 \text{ and } n_0 = k\text{mod}(l+2) \text{ and } n_0 = (k+1)\text{mod}(l+2), (k \in \mathbb{N} \text{ and } k \leq l+1)) \\ (a_{m_0,n_0} - \beta ICI, \text{ if } (\alpha = 0 \text{ and } m_0 = k\text{mod}(l'+1), (k \in \mathbb{N} \text{ and } k \leq l'))) \\ (a_{m_0,n_0} - \alpha ISI - \beta ICI \text{ if } (m_0 = k\text{mod}(l'+1), (k \in \mathbb{N} \text{ and } k \leq l')) \text{ and} \\ n_0 = k'\text{mod}(l+2) \text{ and } n_0 = (k'+1)\text{mod}(l+2), (k' \in \mathbb{N} \text{ and } k' \leq l+1)) \end{cases}$$

with:
    mod the modulo operator,
    α and β selection factors of a type of interference to be processed, 0≤α, β≤1
    ICI an intercarrier interference term determined on said carrier at the location $(m_0,n_0)$ and coming from symbols $a_{m_0+q,n}$ and $a_{m_0-q,n}$,
    ISI an intersymbol interference term determined on said carrier at the location $(m_0,n_0)$ and coming from symbols $a_{m_0,n_0+p}$ and $a_{m_0,n_0-p}$,
    p, q∈$\mathfrak{R}^+$, p∈[-l,l] and q∈[-l',l'], l,l'∈N.

5. The method as claimed in claim 1, characterized in that said step of modulating (32) implements an FTN-OFDM type modulation, and in that said step of precoding (31) delivers, from a symbol $a_{m_0,n_0}$ of the set of symbols, a precoded symbol $c_{m_0,n_0}$ intended to modulate a carrier at the location $(m_0,n_0)$ in said predetermined transmission pattern, such that:

$$c_{m_0,n_0} = \begin{cases} (a_{m_0,n_0} - \alpha ISI & \text{if } (\beta = 0 \text{ and } n_0 = k\bmod(l'+1), (k \in \mathbb{N} \text{ and } k \le l'))) \\ (a_{m_0,n_0} - \beta ICI & \text{if } (\alpha = 0 \text{ and } m_0 = k\bmod(l+1), (k \in \mathbb{N} \text{ and } k \le l))) \\ (a_{m_0,n_0} - \alpha ISI - \beta ICI & \text{if } (m_0 = k\bmod(l+1), \text{ and } n_0 = k'\bmod(l'+1), (k, k' \in \mathbb{N}, k \le l \text{ and } k' \le l'))) \end{cases}$$

with:
mod the modulo operator,
α and β selection factors of a type of interference to be processed, $0 \le \alpha, \beta \le 1$,
ICI an intercarrier interference term determined on said carrier at the location $(m_0, n_0)$ and coming from symbols $a_{m_0+q,n}$ and $a_{m_0-q,n}$,
ISI an intersymbol interference term determined on said carrier at the location $(m_0, n_0)$ and coming from symbols $a_{m_0,n_0+p}$ and $a_{m_0,n_0-p}$
p, $q \in \mathfrak{R}^+$, $p \in [-1,1]$ and $q \in [-l',l']$, l,l'∈N.

6. The method as claimed in claim 1, characterized in that said predetermined transmission pattern is selected by taking into account at least one element belonging to the group including:
a type of modulation implemented in said step of modulating;
a type of prototype filter used in said step of modulating;
a type of channel used for the transmission of said multicarrier signal.

7. A method of receiving a multicarrier signal, delivering a set of estimated symbols, characterized in that it includes:
step of demodulating (41) a set of carriers forming said multicarrier signal, delivering a first subset of demodulated precoded symbols and a second subset of demodulated non-precoded symbols,
a step of time and/or frequency equalization (42) of the demodulated precoded symbols, delivering equalized demodulated precoded symbols,
a step of time and/or frequency equalization (43) of the demodulated non-precoded symbols, taking into account an estimate of interference affecting said demodulated non-precoded symbols obtained from said equalized demodulated precoded symbols, delivering equalized demodulated non-precoded symbols.

8. The method as claimed in claim 7, characterized in that it also includes a step of decoding said equalized demodulated precoded symbols, delivering a first subset of estimated symbols, and delivering said estimate of interference affecting said demodulated non-precoded symbols, and a step of decoding said equalized demodulated non-precoded symbols, delivering a second subset of estimated symbols.

9. The method as claimed in claim 8, characterized in that said step of decoding said equalized demodulated non-precoded symbols also delivers an estimate of interference affecting said demodulated precoded symbols, and in that said step of time and/or frequency equalization (43) of the demodulated precoded symbols takes account of the estimate of said interference affecting said demodulated precoded symbols.

10. The method as claimed in claim 8, characterized in that said steps of decoding implement an algorithm of the Maximum A Posteriori (MAP), logarithmic MAP (Log-MAP) or maximum logarithmic MAP (Max-Log-MAP) type.

11. A generating device for generating a multicarrier signal, from a set of symbols, characterized in that it includes:
a precoding module of a first subset of symbols of said set of symbols, delivering a first subset of precoded symbols,
said precoding module modifying the value of a symbol of said first subset for taking account of interference generated on this symbol by at least one other symbol of said set of symbols intended to be transmitted at the same instant or at the same frequency according to a predetermined time/frequency transmission pattern, and
a modulating module of a set of carriers from said first subset of precoded symbols and a second subset of non-precoded symbols of said set of symbols, delivering said multicarrier signal,
said modulating module modulating each carrier of said set of carriers by a precoded symbol of said first subset or by a non-precoded symbol of said second subset according to said predetermined transmission pattern.

12. A receiving device for receiving a multicarrier signal, delivering a set of estimated symbols, characterized in that it includes:
a demodulation module of a set of carriers forming said multicarrier signal, delivering a first subset of demodulated precoded symbols and a second subset of demodulated non-precoded symbols,
a time and/or frequency equalization module of the demodulated precoded symbols, delivering equalized demodulated precoded symbols,
a time and/or frequency equalization module of the demodulated non-precoded symbols, taking into account an estimate of the interference affecting said demodulated non-precoded symbols obtained from said equalized demodulated precoded symbols, delivering equalized demodulated non-precoded symbols.

13. A non-transitory computer-readable medium storing a computer program comprising instructions for implementation of a method when this program is executed by a processor, the method of generating a multicarrier signal, from a set of symbols, wherein the method includes:
a step of precoding (31) a first subset of symbols of said set of symbols, delivering a first subset of precoded symbols,
said step of precoding (31) modifying the value of a symbol of said first subset for taking account of interference generated on this symbol by at least one other symbol of said set of symbols intended to be transmitted at the same instant or at the same frequency according to a predetermined time/frequency transmission pattern, and
a step of modulating (32) a set of carriers from said first subset of precoded symbols and a second subset of non-precoded symbols of said set of symbols, delivering said multicarrier signal,
said step of modulating (32) modulating each carrier of said set of carriers by a precoded symbol of said first subset or by a non-precoded symbol of said second subset according to said predetermined transmission pattern.

14. A non-transitory computer-readable medium storing a computer program comprising instructions for implementation of a method when this program is executed by a processor, the method of receiving a multicarrier signal, delivering a set of estimated symbols, wherein the method includes:
  step of demodulating (41) a set of carriers forming said multicarrier signal, delivering a first subset of demodulated precoded symbols and a second subset of demodulated non-precoded symbols,
  a step of time and/or frequency equalization (42) of the demodulated precoded symbols, delivering equalized demodulated precoded symbols,
  a step of time and/or frequency equalization (43) of the demodulated non-precoded symbols, taking into account an estimate of interference affecting said demodulated non-precoded symbols obtained from said equalized demodulated precoded symbols, delivering equalized demodulated non-precoded symbols.

\* \* \* \* \*